United States Patent
Dyrlund et al.

(10) Patent No.: US 11,981,101 B2
(45) Date of Patent: May 14, 2024

(54) METHOD AND APPARATUS FOR FORMING AN APEX

(71) Applicant: The Goodyear Tire & Rubber Company, Akron, OH (US)

(72) Inventors: Christopher David Dyrlund, Canton, OH (US); Brian Richard Koch, Hartville, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 335 days.

(21) Appl. No.: 17/331,745

(22) Filed: May 27, 2021

(65) Prior Publication Data

US 2022/0063223 A1 Mar. 3, 2022

Related U.S. Application Data

(60) Provisional application No. 63/072,726, filed on Aug. 31, 2020.

(51) Int. Cl.
*B29D 30/48* (2006.01)
(52) U.S. Cl.
CPC ........ *B29D 30/48* (2013.01); *B29D 2030/481* (2013.01); *B29D 2030/482* (2013.01); *B29D 2030/487* (2013.01)
(58) Field of Classification Search
CPC ........ B29D 2030/482; B29D 2030/481; B29D 2030/488
See application file for complete search history.

(56) References Cited

U.S. PATENT DOCUMENTS

| 5,735,995 A | 4/1998 | Bull et al. |
| 6,623,583 B2 | 9/2003 | Cornet et al. |

(Continued)

FOREIGN PATENT DOCUMENTS

| CN | 107139512 A | 9/2017 |
| CN | 111497296 A | 8/2020 |

(Continued)

OTHER PUBLICATIONS

Miyamoto, JP2013216051, ESpace Net machine translation. 2023 (Year: 2013).*

(Continued)

*Primary Examiner* — Katelyn W Smith
*Assistant Examiner* — Alexander D Booth
(74) *Attorney, Agent, or Firm* — Katherine A. Smith

(57) ABSTRACT

A method and apparatus for forming an apex or an apex in combination with a bead, the method comprising the steps of: winding a strip of rubber onto a rotatable platen to form an apex, wherein the rotatable platen may further include a radially expandable bead chuck for supporting a bead. The rotatable platen may optionally include a nonstick coating such as titanium nitride and optionally include one or more radially oriented bars. The optional one or more radially oriented bars may be movable into a first position flush with the outer surface of the platen, and movable into a second position that preferably is nonflush and protrudes from the outer surface of the platen. The rotatable platen is further optionally retractable from the bead chuck to facilitate removal of the apex from the apparatus.

6 Claims, 5 Drawing Sheets

(56) References Cited

U.S. PATENT DOCUMENTS

| | | | |
|---|---|---|---|
| 2007/0215265 A1* | 9/2007 | Sata | B29D 30/0016 |
| | | | 156/110.1 |
| 2007/0256790 A1 | 11/2007 | Nijhuis | |
| 2012/0111481 A1 | 5/2012 | Weaver | |
| 2013/0340911 A1 | 12/2013 | Lemaire et al. | |
| 2014/0161584 A1* | 6/2014 | Kohnen | B29D 30/48 |
| | | | 248/346.03 |
| 2015/0068668 A1 | 3/2015 | Onimatsu | |
| 2017/0232698 A1 | 8/2017 | Van Werven et al. | |
| 2019/0001601 A1 | 1/2019 | Van Laar | |

FOREIGN PATENT DOCUMENTS

| | | | | |
|---|---|---|---|---|
| EP | 3034287 A1 | | 6/2016 | |
| JP | 11-105155 | | 4/1999 | |
| JP | 2001096641 A | | 4/2001 | |
| JP | 2004017428 A | * | 1/2004 | |
| JP | 2013216051 A | * | 10/2013 | B29D 30/48 |
| JP | 2014144552 A | | 8/2014 | |
| JP | 2015030248 A | | 2/2015 | |
| KR | 20030078503 A | | 10/2003 | |

OTHER PUBLICATIONS

Hirachi, JP2004017428, ESpaceNet machine translation. 2023 (Year: 2004).*

European Search Report for Serial No. EP21194149 dated Feb. 4, 2022.

Chinese Office Action for Application No. 20211101360.2, dated Mar. 8, 2024.

* cited by examiner

METHOD AND APPARATUS FOR FORMING AN APEX

FIELD OF THE INVENTION

The invention relates in general to tire manufacturing, and more particularly to a method and apparatus for forming an improved apex for a pneumatic tire.

BACKGROUND OF THE INVENTION

A conventional radial-ply automobile tire includes radial plies that are wrapped around two annular inextensible beads. The portions of the plies that extend beyond the beads are turned up around the beads, forming "turn-ups." An annular rubber filler bounded by the turned up ply and the bead is called an "apex." The choice of dimensions and material properties of the apex affects the performance of the tire, such as tire weight, sidewall stiffness, handling, ride comfort, flexural heat, material fatigue, and tire life. It is desired to form the apex such that is does not have a splice in order to improve tire uniformity and consistency. It is also desirable to form an apex that has a tip that does not curl. It is also desired to have an improved method and apparatus for making an apex that does not cause the apex to be damaged when removed from the platen.

Definitions

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Tangent delta", or "tan delta," is a ratio of the shear loss modulus, also known as G", to the shear storage modulus (G'). These properties, namely the G', G" and tan delta, characterize the viscoelastic response of a rubber test sample to a tensile deformation at a fixed frequency and temperature, measured at 100° C.

"Laminate structure" means an unvulcanized structure made of one or more layers of tire or elastomer components such as the innerliner, sidewalls, and optional ply layer.

BRIEF DESCRIPTION OF THE DRAWINGS

The invention will be described by way of example and with reference to the accompanying drawings in which.

DETAILED DESCRIPTION OF THE INVENTION

Figure 5:
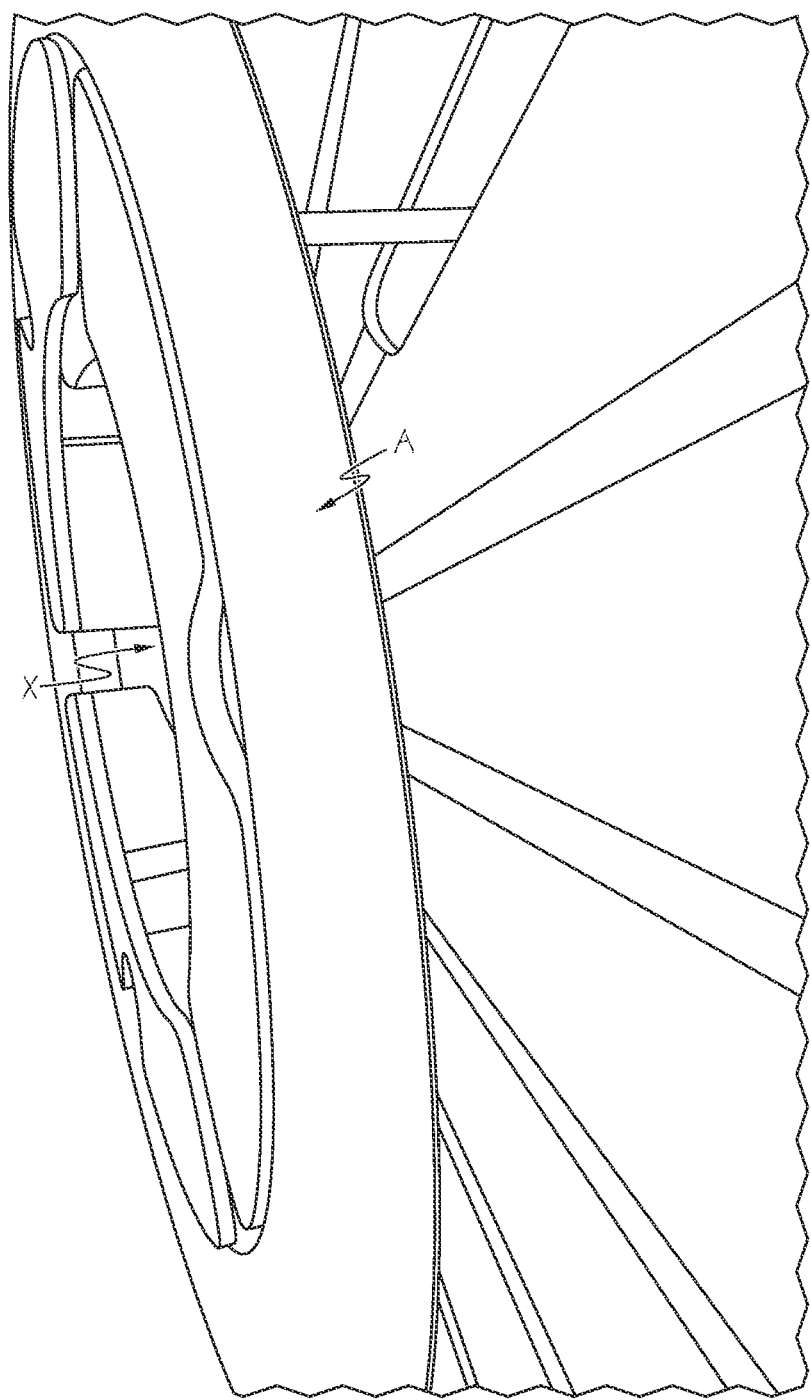
FIG. 5 illustrates the axial retraction of the rotatable platen from the bead chuck to facilitate removal of the apex from the platen.

FIGS. 1-5 illustrates an apex forming apparatus 100 of the present invention. The apex forming apparatus 100 includes an annular flat platen 110 that is rotatably mounted and is preferably oriented in the vertical direction (Z). However, the annular flat platen 110 may also be oriented in the horizontal direction or other desired orientation. Located at the radially inner portion of the annular flat platen 110 is an optional radially expandable bead chuck 115 for receiving a bead. The bead chuck is formed of three or more members 118 that are arranged in a circle for receiving the bead. As shown in FIG. 5, the annular flat platen 110 is retractable in the axial (X) direction away from the bead chuck to facilitate removal of the formed apex A or apex and bead assembly. While the bead chuck holds the bead in place, the annular flat platen provides a rotatable and removable support for applying a continuous strip of rubber that is formed into an apex or a combination bead and apex subassembly.

Figure 1:
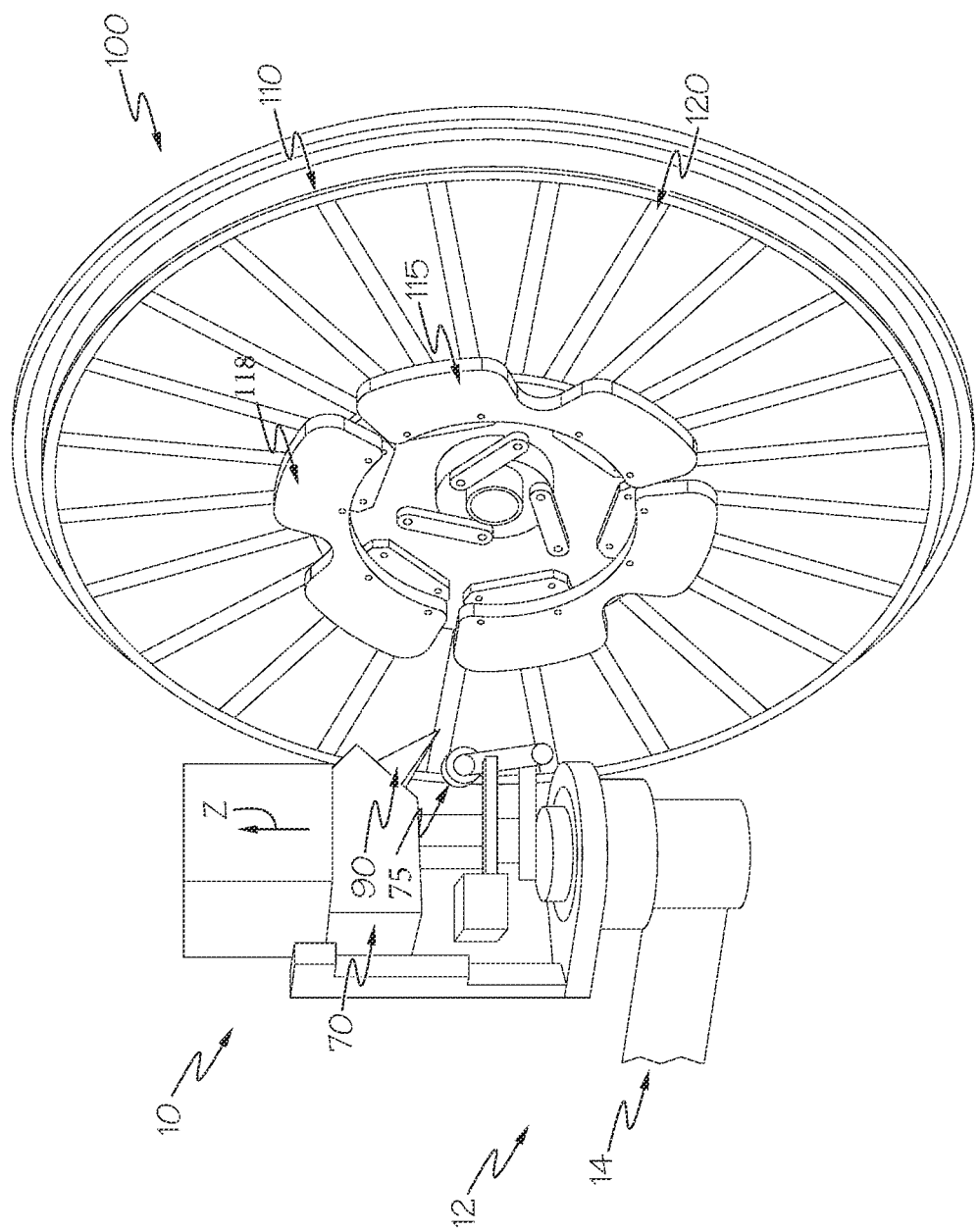
FIG. 1 illustrates a perspective view of an apex forming apparatus which includes a rotatable platen and an extruder apparatus with a pivotable head.

The annular flat platen 110 preferably has a nonstick coating, such as titanium nitride. The annular platen 110 further comprises one or more radially oriented bars 120. The one or more radially oriented bars 120 are mounted on the outer surface of the platen and are preferably coated with the nonstick coating. The annular flat platen 110 further includes at least one or more standoff bars 130 that are preferably oriented in the radial direction. When the platen is mounted in a first position for applying the apex, the radially oriented standoff bars 130 are mounted flush with the surface of the annular platen such as shown in FIG. 1. The one or more the radially oriented standoff bars 130 are also movable into a second position that preferably is nonflush and protrudes from the outer surface of the platen. After the apex has been applied to the bead and annular flat platen and it is time for removal, the annular flat platen 110 is retracted in an axial direction away from the bead support 115. When the annular flat platen retracts, the one or more standoff bars 130 remain in position as shown in FIG. 5. The movement of the platen away from the standoff bars 130 breaks the surface adhesion of the rubber apex, thus facilitating the removal of the apex from the outer surface of the annular flat platen 110.

Figure 2:
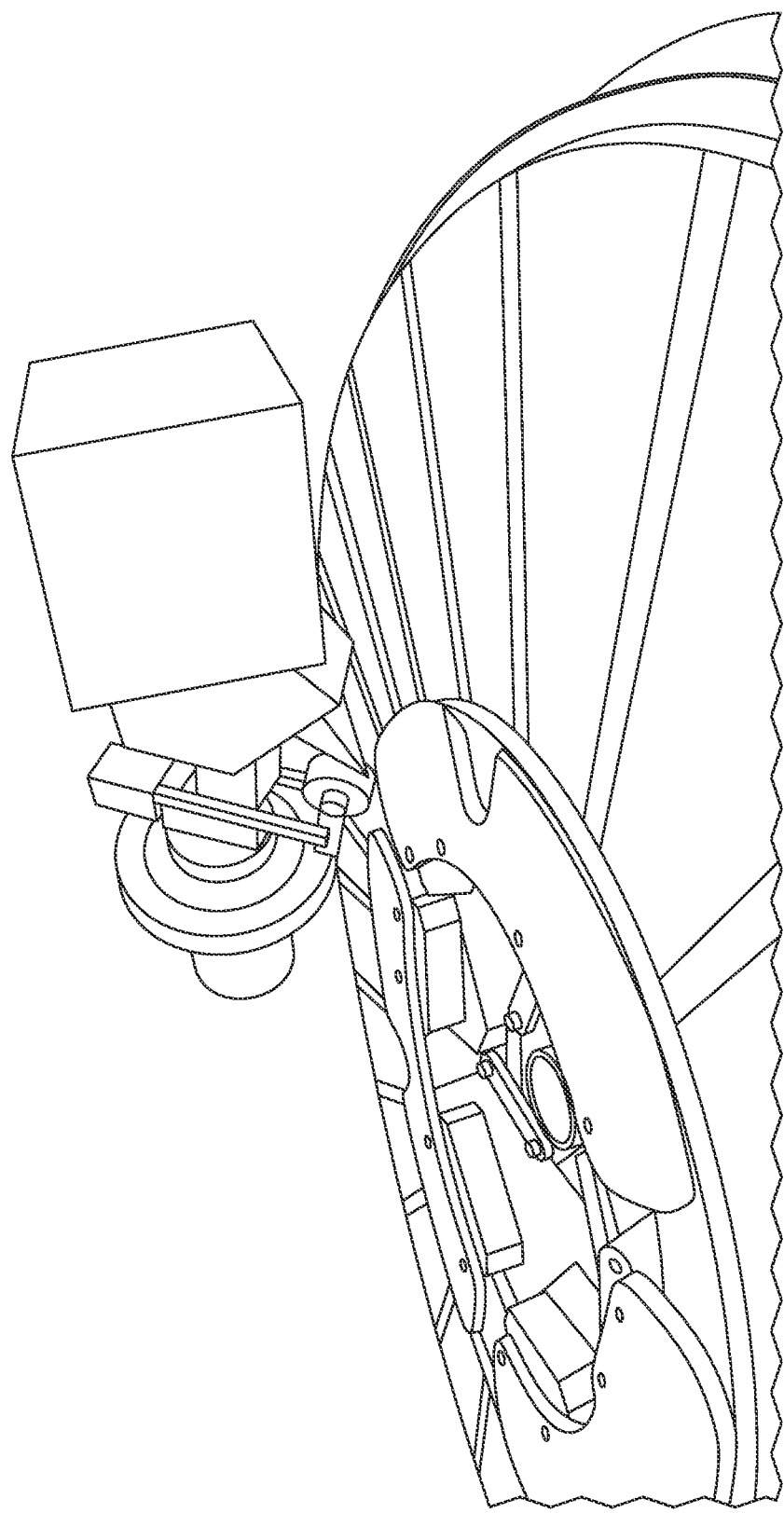
FIG. 2 illustrates a close-up perspective view of a bead mounted in the chuck of the apex forming apparatus.
Figure 3:
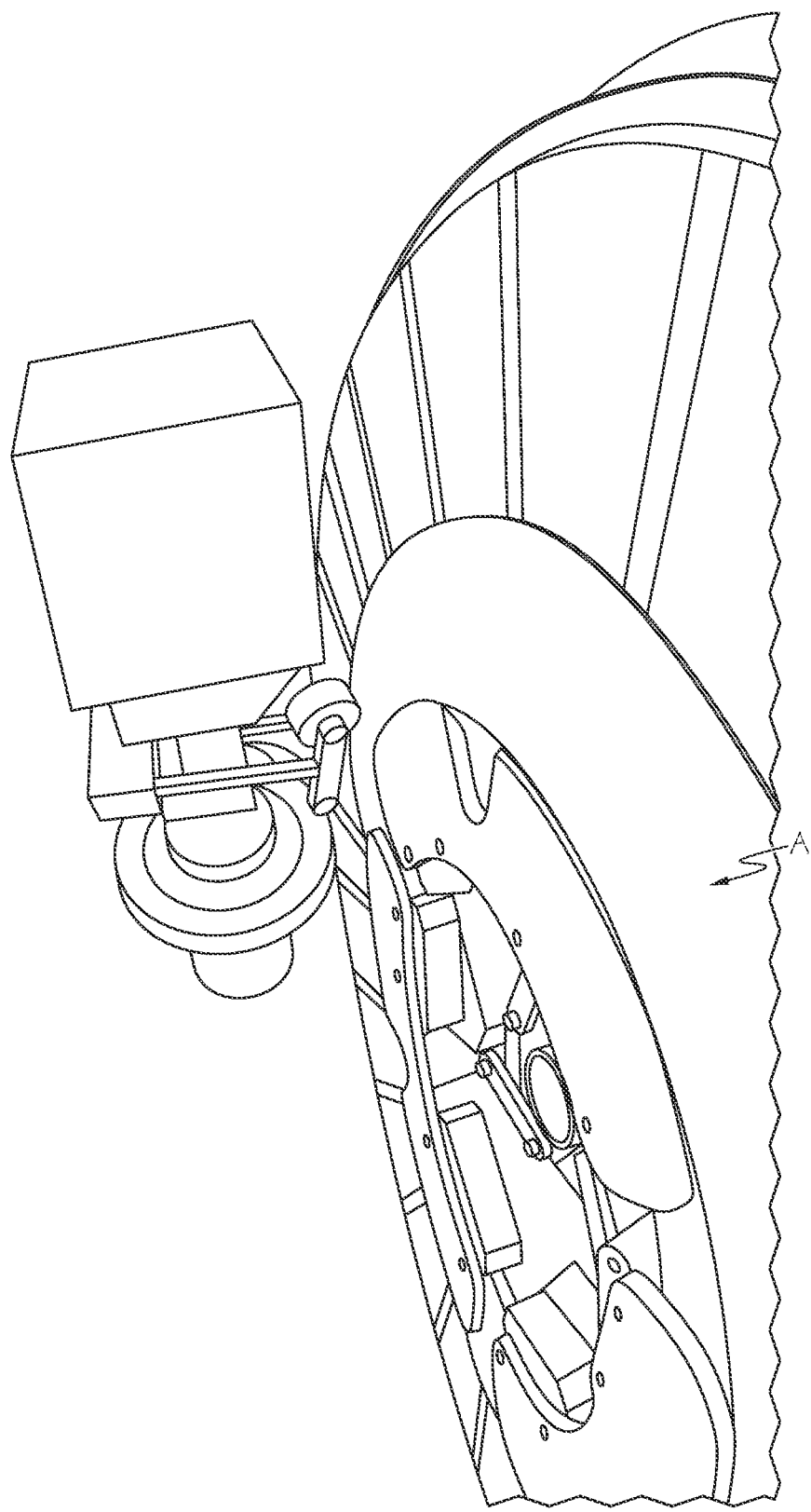
FIG. 3 illustrates an apex being formed on the bead and the rotatable platen by the nozzle of the extruder apparatus.
Figure 4:
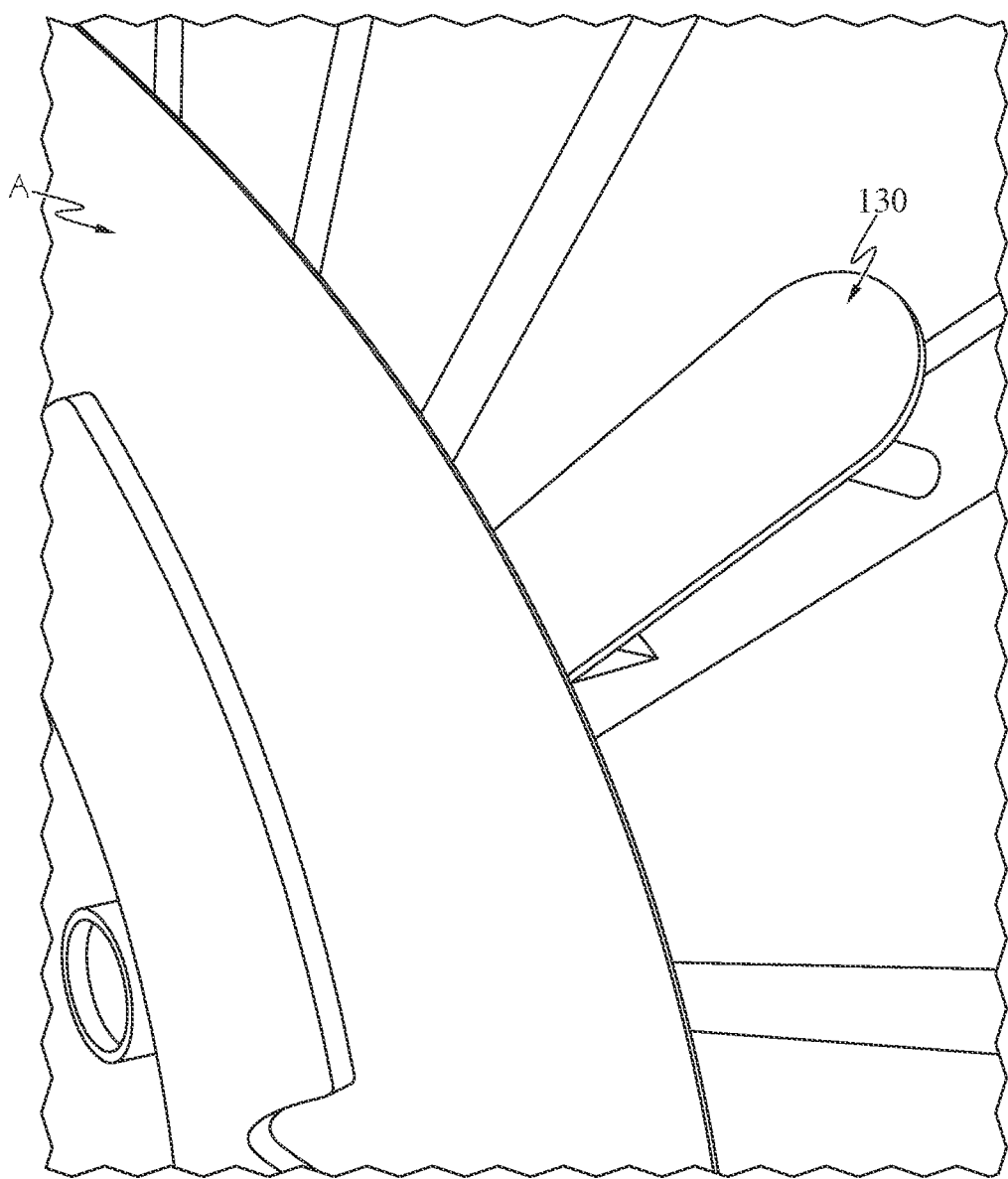
FIG. 4 illustrates the extension of a radial bar from the outer surface of the platen to facilitate removal of the apex from the platen.

FIG. 1 further illustrates a strip forming apparatus 10 which may utilize an optional extruder 12 in cooperation with an optional gear pump 14 to form a strip of rubber. The rubber composition is pumped through the extruder and optional gear pump into a nozzle 70. The nozzle 70 is mounted on a rotatable head 90, which allows the rotatable head 90 and nozzle 70 to rotate about the z axis. The nozzle has a small tapered tip. As best shown in FIGS. 2 and 3, this rotation is important in forming the apex, as the rotatable head and nozzle allows the rubber to penetrate the tight intersection of the bead and platen interface, so that the rubber forming the apex penetrates the bead for good adhesion. Located adjacent the output of the nozzle 70 is a pneumatically driven stitching wheel 75, which facilitates application of the strip to the platen. The stitching pressure is pneumatically controlled. The nozzle 70 is also used to shape the strip of the rubber into a desired geometry.

Variations in the present inventions are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An apparatus for forming an apex and bead subassembly, the apparatus comprising:
   a rotatable platen, a radially expandable bead chuck mounted on the rotatable platen, wherein the rotatable platen has an outer surface having a nonstick coating, and wherein the outer surface further includes one or more bars, and
   one or more standoff bars, wherein the one or more standoff bars are flush with the outer surface of the rotatable platen in a first position, and nonflush when the rotatable platen is axially retracted in a second position.

2. The apparatus of claim 1 wherein the one or more bars are oriented in the radial direction.

3. The apparatus of claim 1 wherein the one or more bars do not have a nonstick coating.

4. The apparatus of claim 1 wherein the rotatable platen is oriented in a vertical (Z) direction.

5. The apparatus of claim 1 wherein the rotatable platen is axially retractable from the bead chuck in an X direction.

6. The apparatus of claim 1, wherein there are at least four standoff bars.

* * * * *